United States Patent [19]

Hunt et al.

[11] Patent Number: 4,973,481
[45] Date of Patent: Nov. 27, 1990

[54] PROCESS FOR PRODUCING RIPPLED SNACK CHIPS AND PRODUCT THEREOF

[75] Inventors: Dewey R. Hunt, Idaho Falls; Kyle E. Dayley, Rigby, both of Id.; Miles J. Willard, 229 N. Lloyd Cir., Idaho Falls, Id. 83402; Donald W. Brister, Spring Town, Texas

[73] Assignee: Miles J. Willard, Idaho Falls, Id.

[21] Appl. No.: 519,246

[22] Filed: May 3, 1990

Related U.S. Application Data

[63] Continuation of Ser. No. 325,158, Mar. 17, 1989, abandoned.

[51] Int. Cl.⁵ .................. A23L 1/164; A23L 1/217
[52] U.S. Cl. .................... 426/144; 426/438; 426/439; 426/512; 426/550; 426/560; 426/637; 426/808
[58] Field of Search ............ 426/144, 550, 560, 637, 426/438, 439, 503, 512, 517, 808, 441

[56] References Cited

U.S. PATENT DOCUMENTS

| | | | |
|---|---|---|---|
| 2,769,715 | 11/1956 | Stahmer | 426/144 |
| 3,027,258 | 3/1962 | Markakis et al. | 426/438 X |
| 3,278,311 | 10/1966 | Brown et al. | 426/560 |
| 3,835,222 | 9/1974 | Wisdom et al. | 426/438 X |
| 3,935,322 | 1/1976 | Weiss et al. | 426/441 X |
| 3,956,517 | 5/1976 | Curry et al. | 426/438 X |
| 3,997,684 | 12/1976 | Willard | 426/637 X |
| 4,302,478 | 11/1981 | Hamann et al. | 426/637 X |
| 4,530,849 | 7/1985 | Stanley et al. | 426/439 |
| 4,645,679 | 2/1987 | Lee et al. | 426/438 X |
| 4,650,684 | 3/1987 | Penrose | 426/144 |
| 4,680,191 | 7/1987 | Budd et al. | 426/144 X |

FOREIGN PATENT DOCUMENTS

| | | | |
|---|---|---|---|
| 701899 | 1/1965 | Canada | 426/144 |
| 1331042 | 9/1973 | United Kingdom | |

*Primary Examiner*—Arthur L. Corbin
*Attorney, Agent, or Firm*—Hopkins, French, Crockett, Springer & Hoopes

[57] ABSTRACT

Corrugated snack food pieces are fabricated from a dough directed through a pair of mated corrugated sheeting rolls. The dough is impressed with the corrugated pattern of the sheeting rolls and subsequently cut into individual snack food pieces. The dough is fed directly into the sheeting rolls so that no prior memory is imparted to the dough sheet prior to receiving its corrugated shape. The corrugated sheeting rolls may be scored transverse to the corrugations to provide transverse webs of dough between adjacent corrugations.

24 Claims, 6 Drawing Sheets

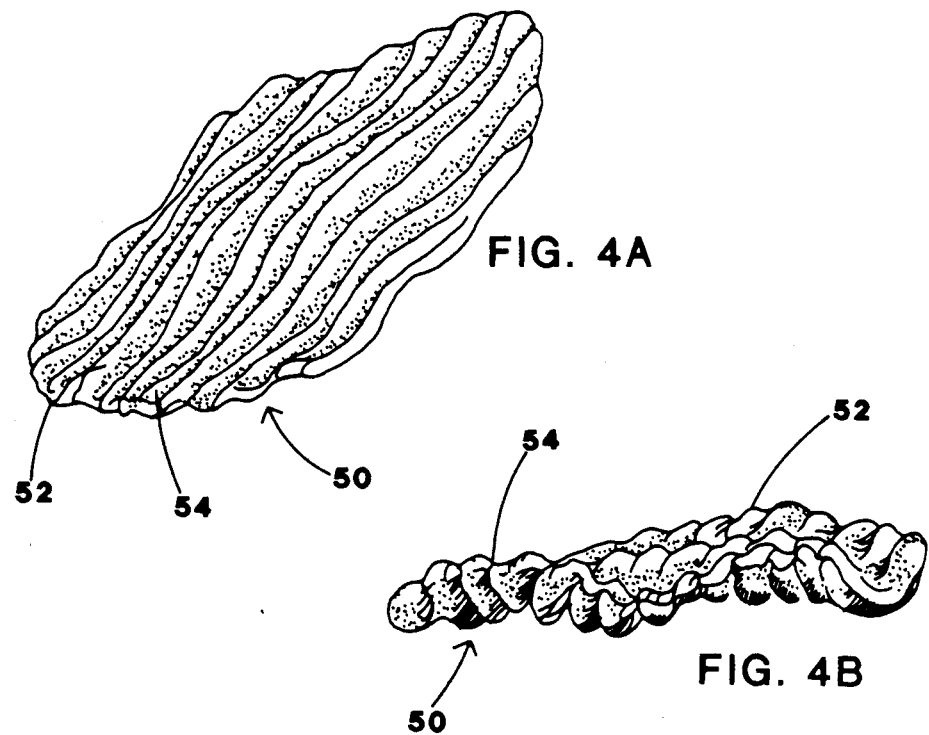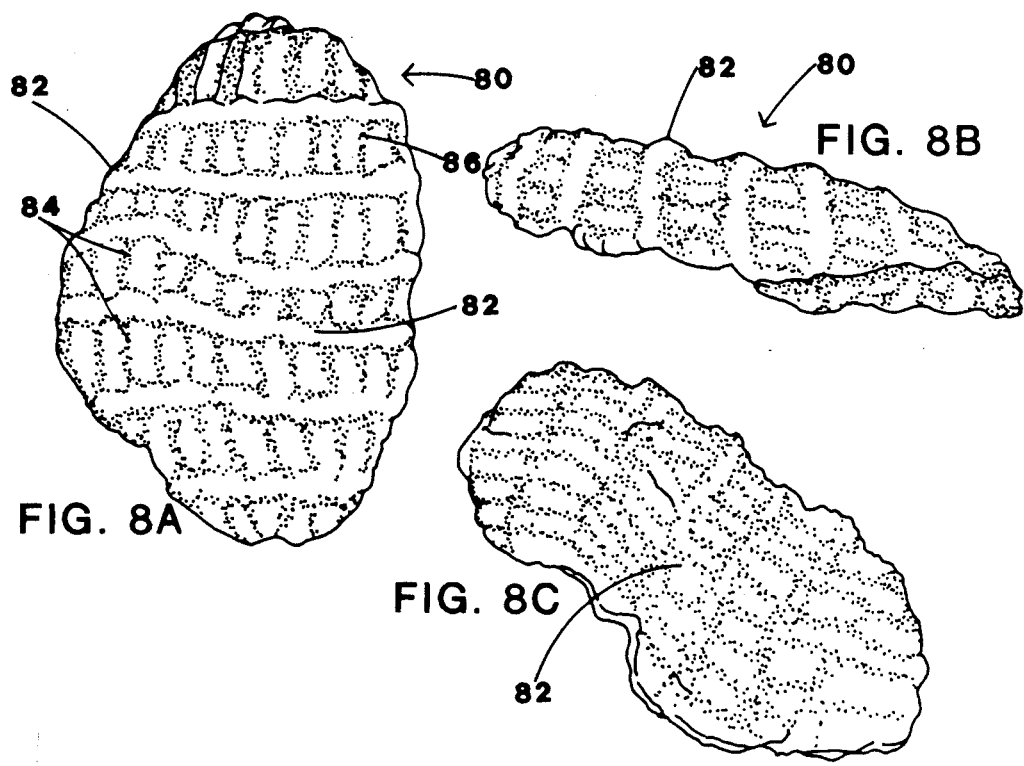

PROCESS FOR PRODUCING RIPPLED SNACK CHIPS AND PRODUCT THEREOF

This is a continuation of application Ser. No. 07/325,158, filed Mar. 17, 1989, now abandoned.

BACKGROUND OF THE INVENTION

This invention relates to a process for making thinly sheeted fried snack pieces from various starch-containing foodstuffs which have a rippled or corrugated surface on both sides of the piece. One preferred embodiment of the invention is particularly suitable for making a rippled potato chip from dehydrated potato ingredients to form snack pieces similar in appearance and texture to rippled potato chips made by cutting and frying fresh potatoes.

The production of conventional potato chips and frozen french fries from fresh raw potatoes by cutting the potatoes into thin flat slices or rectangular shapes, is well known. A variant of these products is made by cutting the fresh potatoes with knives designed to make rippled potato chips (such as Ruffles ® brand potato chips manufactured by Frito-Lay, Inc.) or corrugated or crinkled fried potato pieces (such as Golden Crinkles brand french fries manufactured by Ore-Ida Company). Many alternatives for forming ridged or rippled chips and corrugated or crinkled fresh fries are illustrated in the publications of the Urschel Laboratories, Inc., Valparaiso, Ind. Such products have a pleasing variegated appearance desired by many consumers. Such rippled potato chips are often cut thicker to strengthen the piece for dipping into various condiments. Ripples are provided in the long dimension of the chip so that when subjected to the dipping action, the ripples resist flexing in the longitudinal direction, thereby decreasing breakage. Also see U.S. Pat. No. 4,601,227 for a novel cutter design to produce ridged chips with sidewalls of varied thickness, as well as U.S. Pat. No. 4,511,586 for the product produced thereby. U.S. Pat. Nos. 4,650,684 and 4,508,739 disclose rippled chip products cut from fresh potatoes.

Fabricated frozen french fried potato products made by forming a dough of dried potatoes, forming and frying the resultant dough are also well known. U.K. Pat. No. 1,331,042 describes a process for making "chips" (known as "french fries" in the United States), wherein a continuous ribbon of extruded potato-based dough having a rectangular cross-section is shaped by two pairs of rolls having opposing grooves perpendicular to the direction of dough movement. The pairs of rolls are arranged at right angles to one another and are located sequentially one after the other. In making "simulated scallops", a ribbon of dough is extruded having a circular or oval cross-section, which is cut into thin slices and individually fed through nip of single pair of contra-rotating corrugated rollers. A corrugated sheet of extruded potato dough in the shape of french fries is disclosed in U.S. Pat. No. 4,007,292. The individual french fry pieces are broken from the sheet after heating. U.S. Pat. No. 4,198,437 describes a fabricated french fry having a novel shape.

The production of snack chips and fabricated french fried potatoes from various starch-containing foodstuffs is also well-known in the food industry. Many products have been made from dehydrated potato ingredients. For example, potato chip-like snack products are described in U.S. Pat. Nos. 3,027,258, 3,109,739, 3,935,322 and 3,998,975. U.S. Pat. No. 4,650,687, discloses a process wherein two dissimilar doughs are pressed together, cut and fried to form a snack products resembling a potato skin.

While it is well-known to produce rippled or crinkled chips from fresh-cut potatoes, it has not heretofore been possible to produce similar products from dough compositions comprising chiefly starch-containing solids. U.S. Pat. No. 3,956,517 discloses a process for making a rippled potato chip-type product from a potato dough; however, only one surface of the chip is provided with ripples, not two. The resultant product is not a true rippled chip as the rippled effect is more pronounced on one side of the cooked chip than on the other side.

SUMMARY OF THE INVENTION

The method of the present invention permits the production of a fabricated snack chip having uniform ridges or ripples on both sides of the chip, thereby closely simulating rippled chips produced by cutting fresh potatoes. A further advantage of the method of the present invention is that the thickness of the snack chip pieces can be varied from thin to thick by merely increasing or decreasing the gap between the mated corrugated rolls. It is to be understood that while the method of the present invention finds particular applicability to the production of snack chips, it is adaptable to a wide range of potential uses, and can be adjusted to produce, for instance, a corrugated sheet of preformed potatoes, such as hash browns or croquettes.

In one embodiment of the present invention, a dough is prepared from dry solids comprising (a) dehydrated starch-containing materials, such as potato flakes comprising from about 50% to 100% of the dry solids, (b) one or more raw or ungelatinized starches comprising from 0% to 40% of the dry solids, (c) vegetable oil comprising from 0% to 10% of the solids, and (d) a vegetable emulsifier comprising from 0% to 2% of the solids. The dry solids are combined with water to form a moist, cohesive, but friable dough having a moisture content from about 35% to 50% by weight of the dough. The dough is fed between a mated set of sheeting rolls having corrugated longitudinal grooves over their surface, such that the resulting dough sheet has a uniformly rippled top and bottom surface and a uniform thickness throughout the width of the sheet. The dough sheet thus formed is cut into desired shapes and fried in hot cooking oil to a moisture level below 2% to produce a rippled potato chip snack similar in appearance, texture and flavor to a rippled potato chip made from a fresh cut potato.

In another embodiment of this invention, a waffle design can be impressed on one or both surfaces of the rippled chip. The waffle design is achieved by milling a transverse groove across the face of one or both of the grooved rolls, perpendicular to the longitudinal grooves producing the grooved chip. Such transverse grooves may be provided with a spacing of from about 2 to about 20 times as great as the spacing of the longitudinal grooves. Preferably, the spacing between the transverse grooves is on the order of 3–4 times the spacing between the longitudinal grooves. By controlling the depth of the transverse grooves, the depth of the transverse rib produced thereby can be fixed at a percentage of the amplitude of the longitudinal groove. We have found it desirable that the transverse waffle groove have a more narrow (steep sided) design than the longitudinal grooves; that is, the side walls of the transverse groove aligned at about 15 to about 40 degrees from a radius of the sheeting roll. Therefore, the lateral "thickness" of the transverse web will be thinner than the thickness of the chip.

The rippled chips of this invention can be produced from farinaceous cereal grains, primarily corn or limed corn flours known as masa flour. Conventional tortilla snacks are made from whole kernel corn which has been cooked in a hot lime solution, soaked, washed to remove the softened hull and ground to form a plastic dough containing about 50% moisture. The resulting corn masa is very adhesive and could not easily be used in the process of this invention as it would not separate satisfactorily from the grooved rollers. Instead, the process of U.S. Pat. Nos. 4,623,550 and 4,770,891, which are incorporated by reference herein in their entirety, can be adapted, so as to produce dough consistencies ranging from extremely friable to very cohesive but not adhesive, as required for use with the grooved rolls of this invention.

An additional embodiment of this invention comprises heating the cut and rippled dough pieces to partially dry the surface thereof prior to frying, as described in U.S Pat. No. 4,931,303 which is incorporated herein by reference. Such heat treatment removes water from the dough, resulting in fried products having lower fat content and more aerated texture.

This and other aspects of the invention will be more fully understood by referring to the following detailed description.

BRIEF DESCRIPTION OF THE DRAWINGS

FIGS. 4a and b are illustrative examples of snack chips produced by the method of the invention;

FIGS. 8a, b and c are illustrative examples of snack chips produced by the apparatus of FIG. 6;

DETAILED DESCRIPTION OF THE INVENTION

Figure 1:
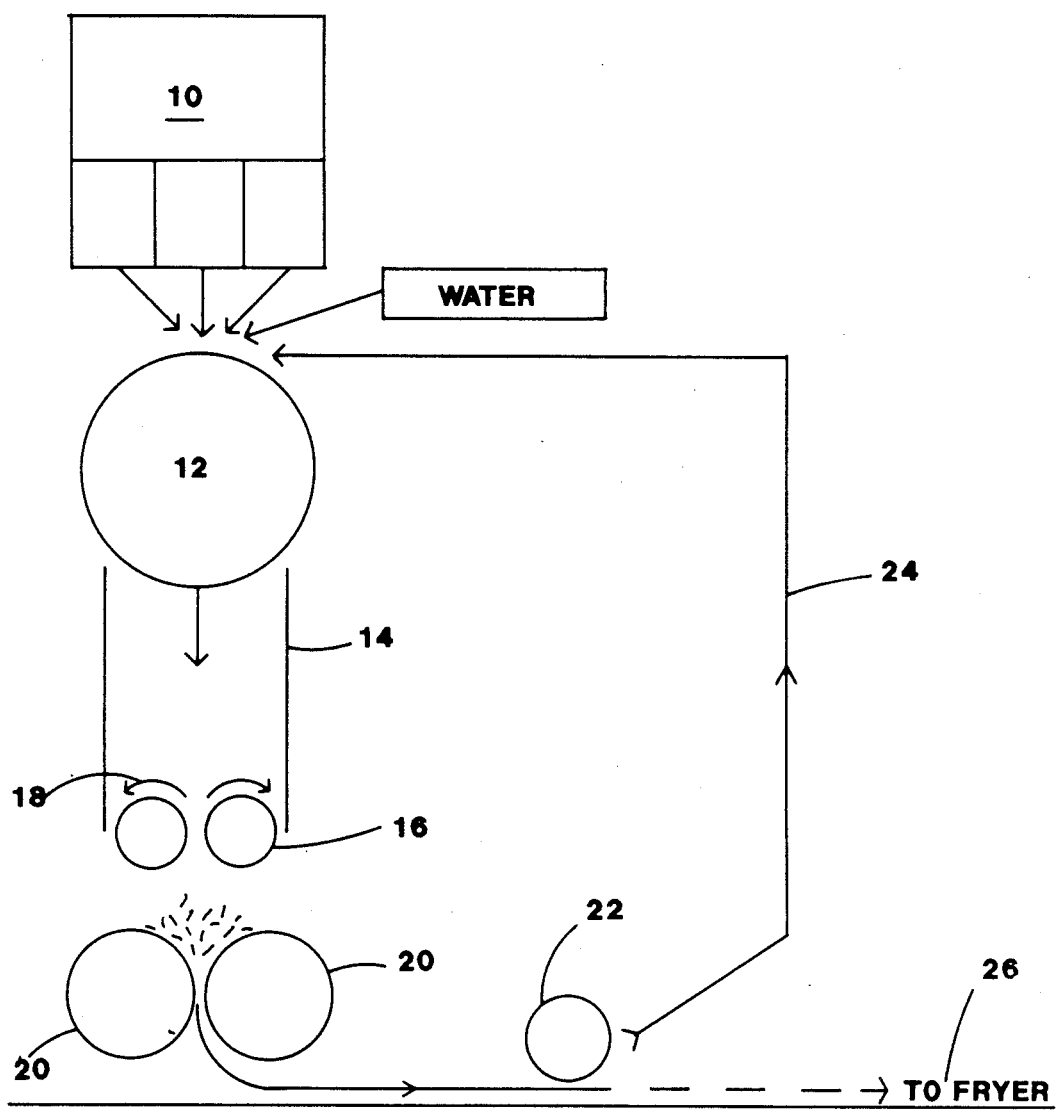
FIG. 1 is a schematic view illustrating the process for producing a rippled snack chip of this invention.

This invention generally provides a method for producing a sheeted, rippled snack chip (hereinafter "ripple chip" or "rippled chip") from dry starch-containing ingredients. In its broadest embodiment, the invention comprises the steps of: (1) adding water to the dry ingredients with suitable mixing to form a cohesive, relatively non-sticky dough, (2) passing the dough through opposing corrugated sheeting rolls to produce a uniformly rippled dough sheet with generally V-shaped ridges on both the top and bottom surfaces, (3) cutting the sheeted dough with a suitable cutter into any desired shape and, (4) cooking the cut pieces to produce a crisp snack chip having rippled top and bottom surfaces similar to those which have been cut from fresh potatoes. Alternatively, the rippled chip may be produced by a process whereby the dough mix of step 1 above is first sheeted through a set of opposing smooth rolls to produce a flat, smooth dough sheet which is then passed through the corrugating rolls of step 2.

In a preferred embodiment, the dough utilized herein is a formulated dough suitable for sheeting and subsequent deep-fat frying. The dough may be formulated from any of a variety of ingredients, such as from dried potatoes, starches or farinaceous materials (potatoes, corn, rice, wheat, etc., and mixtures of the same) or proteinaceous materials such as soy, peanuts, sunflower seed, etc., or any combination thereof. The dough material must be capable of processing through a pair of grooved sheeting rolls described below. Other ingredients may be added, such as emulsifiers, oil and flavoring agents to aid processing of the dough or improve the taste of the finished product.

In the preferred embodiment, novel ripple chips are produced from a dough having a composition of from about 50% to 100% potato flakes, about 0% to 40% raw or ungelatinized starch, about 0% to 10% vegetable oil and about 0% to 2% vegetable emulsifier. While potato flakes are the preferred potato-flavoring dry ingredient, other dry potato products, such as granules or ground dehydrated potato pieces, may also be used, either in combination with or as a replacement for potato flakes. Sticking of the dough to corrugated sheeting rolls is obviously of greater concern than with conventional smooth sheeting rolls. Therefore, it is critical that dough moisture be adjusted periodically to account for changes in the absorption characteristics of the particular batch of dehydrated potatoes to ensure smooth release from the rolls. Therefore, dough moisture is adjusted to between about 35% to 50%, by weight, by adding water. The dough is then fed into the nip between a pair of corrugated sheeting rolls described below. A dough sheet is formed having substantially uniform V-shaped ripples on both of the top and bottom surfaces and a uniform thickness. Of course, the thickness of the dough sheet thus formed depends upon the gap between the two corrugated sheeting rolls. Applicant has found that a gap of from about 0.25 mm to about 1.75 mm, and most preferably from about 0.5 mm to about 1.0 mm, is desirable when producing the products by the process of the present invention. The dough sheet thus formed is cut into desired shapes by means of a circular rotating cutter and fried in hot cooking oil at a temperature from about 275° F. to about 400° F., preferably at about 300° F. to 350° F., with a fry time of from about 20 seconds to about 60 seconds. A crisp, crunchy potato snack having a moisture content of less than about 2% is formed. It is to be appreciated that, rather than cooking the snack pieces entirely or predominantly in hot oil, the individual dough pieces can be cooked by any known method for removing water from snack food pieces.

Referring to FIG. 1, the preblended dry ingredients 10 for the dough formulation are mixed with water in a mixer 12. The water is preferably at a temperature of from about 60° F. to about 110° F. during the mixing step. The particular type of mixer used and the quantity of water added to the dough are dictated by the choice of ingredients, the desired characteristics of the finished snack product, environmental conditions, and the difficulty experienced in removing the dough sheet from the corrugated sheeting rolls. The moisture content of the dough is generally in the range of from about 35% to about 50%, most preferably about 40–45%, by weight of dough. If significant dehydration of the dough occurs between mixing and frying, a higher initial dough moisture may be necessary in order to assure adequate moisture at the time of frying.

The mixer used can be selected from a large group of batch and continuous units capable of producing a thoroughly mixed dough with a controlled level, preferably low, of shear. For example, the dry ingredients can be blended with water in a Stephan mixer, available from Stephan Machinery Company, West Germany. In this mixer, rotating blades fixed to a central shaft are driven at speeds of from 900 to 3600 rpm, while a scraping arm continuously removes material adhering to the inner surfaces of the mixer. Mixing times in such units are shorter by a factor of 10 or 20 than the more conventional paddle mixers. Due to the high level of energy transmitted to the dough during mixing, mixing time must be carefully controlled to avoid excessive shear.

Rather than being mixed in batch mixers, premixed dry ingredients and liquids can be mixed continuously for subsequent processing. Continuous blending mixers for adding water to premixed ingredients are available from several sources, including Littleford Bros., Inc. of Florence, Ky. and Wenger Manufacturing Co. of Sabetha, Kans. Continuous mixing greatly simplifies the process but requires careful adjustment of flow-controlling devices to ensure the desired amounts of the dry and liquid ingredients are combined in the process. Continuous moisture monitoring devices, well known and readily available commercially can be used to measure and control water addition to the dough to establish uniform processing characteristics throughout the remainder of the process.

After the dough is adequately mixed, it is directed to the sheeting line by first passing it through vertical feeder 14. While the embodiment of FIG. 1 illustrates many of the components utilized in this process above one another, they may easily be positioned side-by-side, with the output of one step conveyed by conventional conveyors to the next step. The vertical feeder 14 is a conventional apparatus having cooperating counter-rotating paddles or rolls 16, adapted to force the dough to the outer portion of feeder 14, as indicated by arrows 18.

The dough is fed from feeder 14 by conveyor or by gravity to a pair of opposed counter-rotating corrugated sheeting rolls 20. In a preferred embodiment, the rolls 20 are mounted horizontally adjacent one another about parallel axes of rotation. The vertical feeder 14 is required to properly regulate appropriate quantities of dough to the corrugated sheeting rolls 20. The rolls 16 must rotate "outwardly" in order to prevent bridging of the dough across the inside of the feeder above the rolls 16. A critical feature of the present invention is that the unworked dough is fed to the rolls 20 without prior reduction or sheeting. In conventional manufacture of formed, sheeted snack food products, such as in the '687 patent and the '517 patent, the dough sheet is subjected to one or more reductions, or sheeting steps, before the final reduction to form the dough sheet in its final form. Because the moisture content of such doughs is relatively low (less than 50% moisture), it was previously thought that the dough sheet must be reduced to the final thickness before any particular shape was imparted to it.

However, Applicants have discovered that reducing the dough sheet of the present invention prior to imparting the ripple effect to the sheet with the corrugated sheeting rolls 20 is in many cases counterproductive. Applicants have observed that chip products from a dough sheet which is first reduced, and then "rippled" with rolls 20, lose much of the ripple imparted by rolls 20 when fried. Rather than producing a chip product having ripples similar to the "Ruffles" brand potato chips, such products are relatively flat with barely perceptible waves, rather than distinct two-sided ripples. While not wishing to be restricted to any particular theory, Applicants believe that the work imparted into the dough sheet by a pair of conventional flat sheeting rolls imparts so much "memory" into the flat dough sheet that subsequently-formed ripples are lost when the snack pieces are fried. Ripples are easily imparted to the reduced dough sheet, however they just as easily disappear when fried.

The loss of the ripple effect led Applicants to the process of the present invention—that is, the formation of a rippled dough sheet directly from unformed dough. Such process overcomes the "return-to-memory" problem described above. However, because dough is conventionally sheeted to a final thickness of about 1–2 mm in a plurality of sheeting or reducing steps, doing so in one step requires heavy duty rolls capable of imparting the same amount of work into the dough sheet. Therefore, use of heavy duty rolls (for example, 16-inch diameter rolls rather than 12-inch diameter rolls) and other measures well known to those skilled in this art, must be practiced in the process of this invention.

The use of a pair of cooperating grooved or corrugated sheeting/reducing rolls presents special problems. The great deal of work put into the dough sheet by the grooved rolls is likely to induce sticking of the dough in the grooves of one or both rolls. Such problems may be overcome by adjusting the dough moisture or by providing the rolls with low-sticking surfaces, such as Teflon ® or ceramic coatings. A small differential speed between the rollers, or difference in temperature may be used to ensure that the dough transfers to the desired roll.

Proper control of dough thickness is important in the manufacture of sheeted snack products. Measurement of thickness of a rippled dough piece is difficult with conventional measuring apparatus, such as calipers. Therefore, Applicants have found it convenient to adjust dough thickness by weighing uniformly sized pieces of dough cut from the grooved sheet after the sheet is formed.

After formation of the rippled sheet by rolls 20, the rippled dough sheet is conveyed by conventional means, and without further reduction, to a rotating cutter 22 which produces the shape desired for the finished fried product. For simulated rippled potato chips, a cutter having shapes resembling various size potato chips has been found useful. For producing snacks from other ingredients, such as corn, a cutter having other shapes such as triangles or circles can be provided. After cutting into the desired shape, the unused portion of dough web is preferably recycled, at 24, back to the mixer for inclusion in subsequent batches of dough. The recycled dough web can be comminuted prior to addition to mixer 12.

The individual dough pieces may be partially baked or dried prior to frying to remove surface moisture. If moisture reduction is not extreme, noticable large bubbles will not be formed on the surface of the fried chips, while the lower dough moisture will result in lower fat content of the fried product.

The individual dough pieces are conveyed into conventional frying equipment 26. The float fryer of U.S. Pat. No. 4,650,687 can be used to produce a gently curved ripple chip, or conventional fryers such as those used for producing potato or tortilla chips can be used to produce randomly curved snack food pieces. The products are removed from the fryer and packaged by techniques well known to those skilled in this art.

Applicants have produced highly desirable rippled chip products by the process set forth above. However, an alternative chip design, wherein webs of dough are provided transverse to the grooves on the chips, may be desirable. The product resulting therefrom is described as having a "waffle" design. Applicants have found that in some situations the rippled chips produced by the process described above may exhibit undesirable levels of breakage along the grooves of the chips. Such breakage can be eliminated or reduced by providing the lateral stability of such webs. Even without consideration of breakage, however, the waffle design of such chips presents a novel and pleasing appearance to consumers. The number and spacing of the transverse dough webs, and whether or not such webs are provided on only one or both sides of the chips, depends on the specific requirements of each situation. Chip products in which the transverse dough webs are relatively large, i.e. they span the full height of a land area between adjacent groove areas and are relatively wide at the base, will yield fried chip products having a distinctly firmer crunchy bite and a high bulk density. Transverse dough webs having a height of one-half or less the height of the land areas have a texture and bulk density similar to non-waffled rippled chips but still retain the appearance of a waffle chip.

Figure 2:
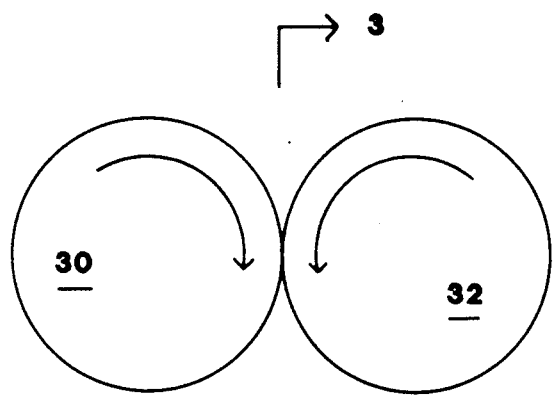
FIG. 2 is a schematic side view of a pair of sheeting rolls of this invention.
Figure 3:
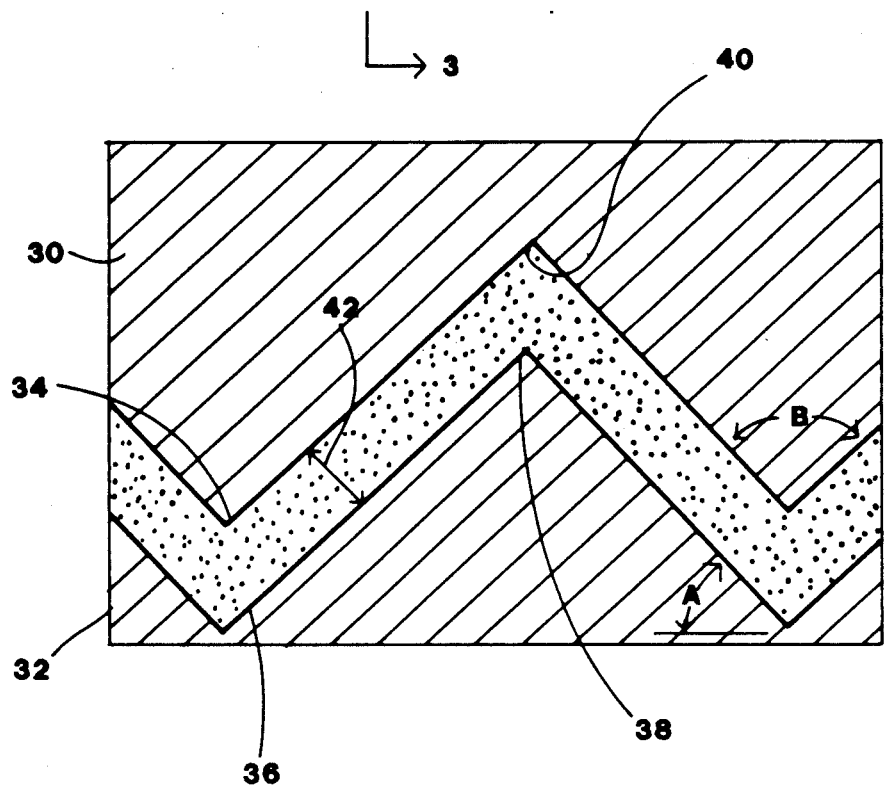
FIG. 3 is a sectional view of the corrugated sheeting rolls taken along lines 3—3 of FIG. 2.

More specifically, and referring to the drawings, FIG. 2 illustrates a schematic side view of a pair of corrugated rolls of this invention. As illustrated, the rolls 30, 32 intermesh with one another and counter rotate about parallel horizontal axes. FIG. 3 illustrates the intermeshing of the land areas 34 of roll 30 with the groove areas 36 of roll 32, and conversely, the land areas 38 of roll 32 with the groove areas 40 of roll 30. As illustrated, the mated rolls 30, 32 are provided with land/groove areas arranged at an angle "a" of 45 degrees from the axis of the roll, while the interior angle "b" defining the lands and grooves is 90 degrees. Because the two rolls are mirror images of one another, the nip, or gap 42 between the rolls is constant. It is to be understood that while a preferred embodiment has been described, Applicants believe that the particular engular configuration is not critical to this invention, any groove design which results in uniform distance between the two rolls at any point on their surface, at any distance between the rolls, are acceptable in the process of this invention.

The rippled chip product 50 resulting from the rolls of FIG. 3 is illustrated in FIG. 4. The land areas 52 and grooves 54 are formed in the nip 42 between the rolls 30, 32. The distinct corrugations, and the three-dimensional appearance of the chip, closely simulates that of rippled chips from fresh cut potatoes.

Figure 5:
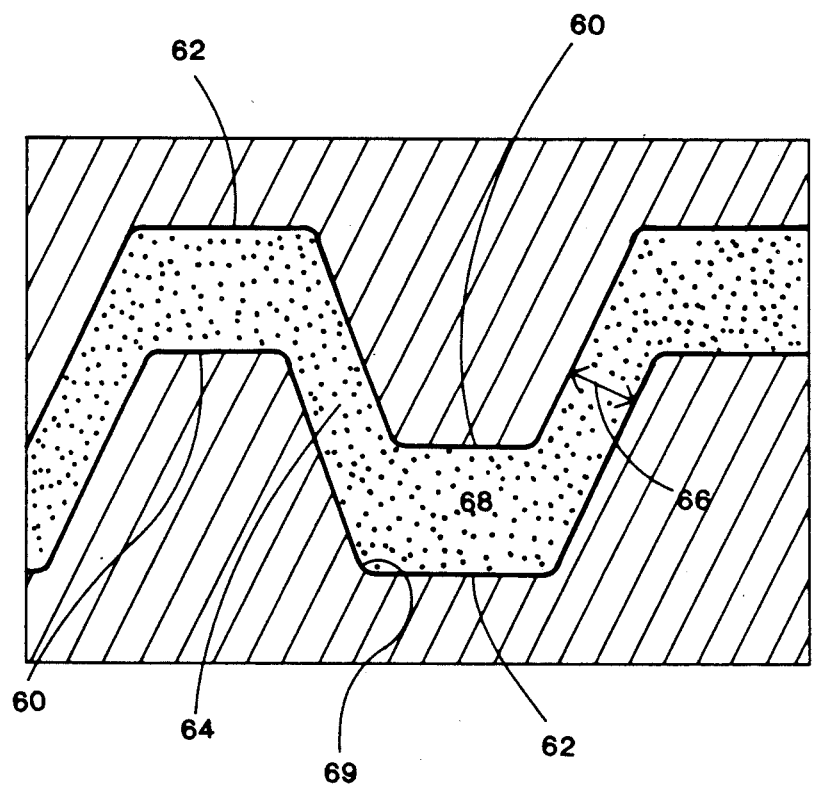
FIG. 5 is a sectional view similar to FIG. 3 of an alternative embodiment of the present invention.

An alternative corrugated roll design is illustrated in FIG. 5 having truncated land areas 60 and squared-off grooves 62. Such design results in chips having squared-off ridges and grooves. While the overall effect is of a "rippled" surface, the chips do not closely resemble fresh cut ripple potato chips. The rolls of FIG. 5 produce acceptable chip products, but which are less preferred than the products from rolls of FIG. 3. While not wishing to be bound by the following explanation, Applicants believe problems associated with the design of FIG. 5 are related to the flow of the dough as it is compressed between the mated rolls from the feedpoint to the point of minimum gap between the rolls. Comparison of the dough response as it is compressed between the mated rolls of FIGS. 3 and 5 indicates that the dough compressed between flat surfaces 60, 62 of FIG. 5 undergoes substantially greater compression than dough being compressed in area 42 of FIG. 3, or in area 66 of FIG. 5. The areas of dough weakness and compaction that result make removal of the dough sheet from the rolls difficult and cause stressed areas in the dough that lead to excessive breakage of the fried snack products.

Figure 6:
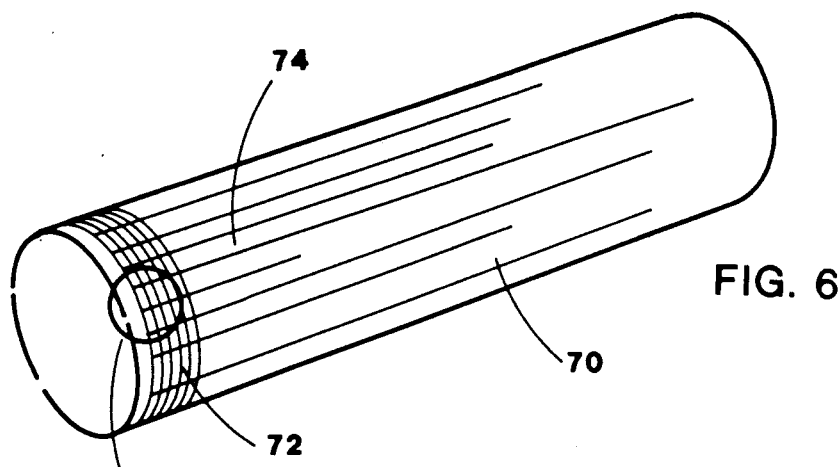
FIG. 6 is a partial perspective view of an alternative roll design used in the present invention.
Figure 7:
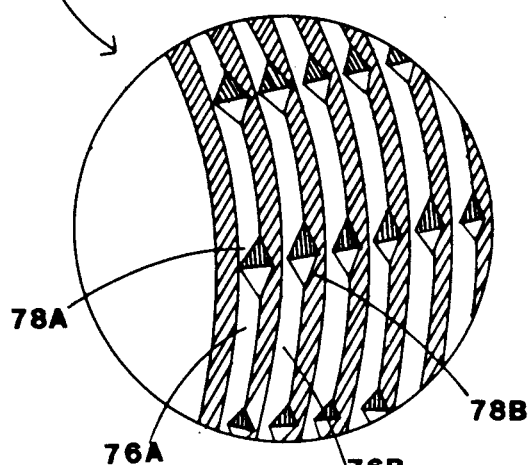
FIG. 7 is an enlarged view of the encircled portion of FIG. 6.

A grooved roll used in the process of the present invention is illustrated schematically in FIG. 6. The roll 70 is provided with a series of equally spaced circumferential grooves 72. To produce the ripple chip product of FIG. 4, a pair of rolls having cooperating grooves are mated. However, if the grooves of roll 70 are scored as at 74 transverse to the direction of the grooves (parallel with the rotational axis of the roll), a waffle chip is produced. FIG. 7 illustrates the scoring of the grooves in greater detail. A cutting blade having a triangular cutting surface is preferably used, so that adjacent land areas 76a and 76b are scored, as at 78a and 78b. The spacing between circumferential score lines 74 is dependent upon the desired web interval in the chip product.

Figure 9A:
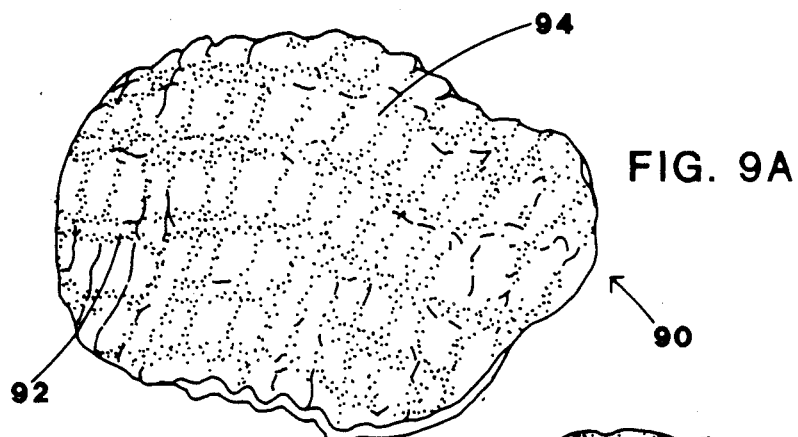
FIGS. 9a and b are alternative examples similar to those of FIG. 8.
Figure 9B:
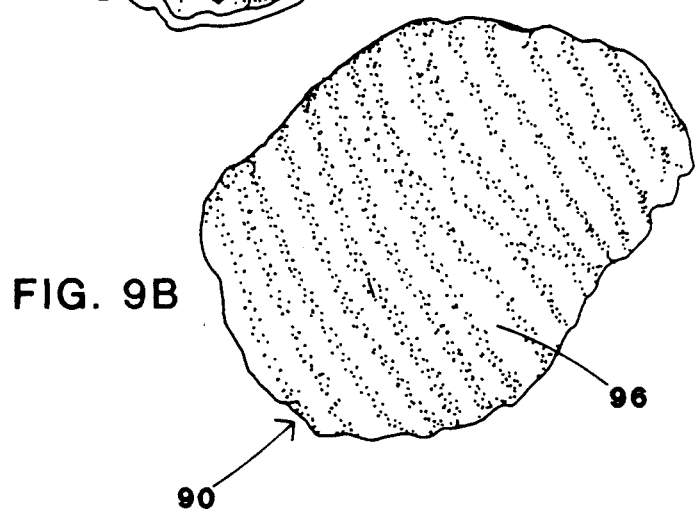

A representative chip product 80 resulting from the use of mated rolls 70 is shown in FIG. 8. When both rolls are scored, transverse webs 82 perpendicular to grooves 84 and ridges 86 are provided on both sides of the chip 80. When a grooved, scored roll 70 is mated with a grooved, but nonscored roll, the chip product 90 of FIG. 9 is produced, wherein transverse webs 92 are provided on one side 94 of the chip but not the other side 96.

As is evident from the view of, for example, FIG. 8b., the transverse web 82 may be somewhat thicker than the remainder of the chip. If the roll 70 is scored to the bottom of groove 72 a "deeper" or thicker web 82 will be formed. Applicant has observed that the transverse web 82 may expand to a greater extent than the remainder of the chip.

Figure 10:
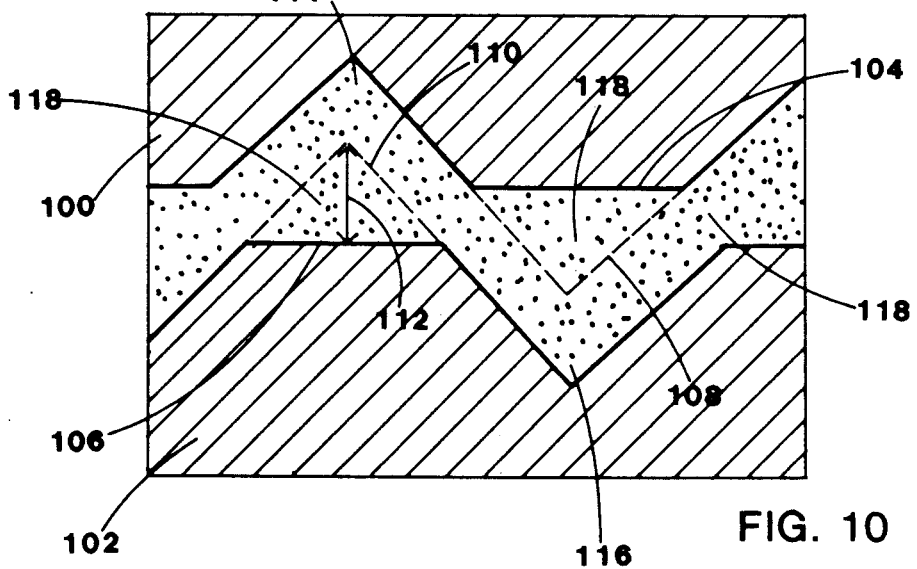
FIG. 10 is a sectional view similar to FIG. 3 of a pair of rolls as illustrated in FIG. 6.

FIG. 10 illustrates the mating of a pair of scored corrugated sheeting rolls 100, 102 of FIG. 3. The land areas 104 and 106 have been scored in the section of FIG. 10; the broken lines 108 indicate the land area 104 circumferentially removed along the land area from the score line. The relative depth of the transverse web, indicated by arrow 112, depends upon the amount by which (the depth) the land areas are scored. In the illustration of FIG. 10, the ridge 114 corresponds to the ridge 86 of FIG. 8 while the groove 116 corresponds to the groove 84 of FIG. 8. The transverse web 118 is defined by the scored ridges and corresponds to web 82 of FIG. 8

Designs, such as corporate or product logos, can be embossed into the surface of a rippled chip product by scoring the logo onto the grooves of the sheeting rolls. Such designs provide not only a visual purpose but also serve to strengthen the fried chip product.

The dough used to produce rippled chips of this invention must have a highly cohesive but not adhesive nature so that the dough, after forming into the ridged shape, will easily discharge itself from the grooved rollers. For the potato-based product, it is desirable to use a dehydrated potato ingredient having relatively high water holding power. A frequently used to measure dehydrated potato absorption is the peak Brabender viscosity. In the manufacture of the products of this invention, drum dried potato flakes are the preferred ingredient. Flakes for industrial use are typically ground by the manufacturer to a particle size consistent with the final usage. Processing conditions for flake manufacture are described in *Potato Processing*, Fourth Edition, 1987 Talburt and Smith, Van Nostrand Reinhold Company, New York. Producing ground potato flakes to meet specifications of high absorption power, low sugar content and good flavor are well known to those familiar with the art. Potato granules, another form of instant mashed potatoes, can also be included in the formulation depending on its absorption and the effect on dough quality and snack expansion. According to the method of U.S. Pat. No. 3,886,291, the relative quantities of these ingredients can vary over a wide range.

Dehydrated potatoes in piece form can be ground to a fine flour and incorporated as well as minor amounts of gums, binders and other dough consistency modifiers. The potato products can also be combined with minor amounts of corn solids using, for example, dry milled corn flours produced by conventional dry milling. In addition, whole cereal grains or other compatible foodstuffs, such as potato skins, cereal bran or ground legumes, may be added to the potato formulation to give variations in flavor and texture.

The starch component of the dough may be selected from a number of raw starches, commercially available, such as potato, corn, tapioca and the like, although potato starch is preferred. The vegetable oil described above may be any of a number of commonly known oils such as are made from corn, soybean and cottonseed. Various monoglyceride emulsifiers known in the art can be added to control dough characteristics. One preferred vegetable emulsifier is glycerol monooleate, commercially known as Durem GMO and manufactured by Durkee Foods, Inc.

When producing rippled corn-based products, the process of U.S. Pat. Nos. 4,623,550 and 4,770,891 preferred as it makes it possible to vary the consistency of the dough over a wider range than can be achieved by using conventional ground corn.

EXAMPLE 1

Rippled fabricated potato chips were prepared in a continuous pilot plant test. Ten kg of dry premix containing 9.4 kg of dehydrated potato flakes, 0.5 kg of raw potato starch, 57 gm of a 64% corn oil/36% cottonseed oil blend, 46 gm of salt and 19 gm of Durkee Durem GMO emulsifier was blended with 5.9 kg of cold water in a Stephan 40-liter cutter-type mixer for 45 seconds. A cohesive, but friable dough containing numerous marble-sized agglomerates was produced. The dough thus formed was fed by hand between a set of 12-inch diameter by 18-inch wide corrugated sheeting rolls with matching corrugated surfaces in the V-shaped design of FIG. 3. The amplitude of the grooves was approximately 1.95 mm and the frequency of the grooves was 6.5 per inch across the rolls.

The dough exited the sheeting rolls onto a conveyor belt in a continuous sheet approximately 18 inches wide at a relatively uniform thickness of from about 0.65 mm to about 0.70 mm. The dough sheet was then cut into hexagonal shapes about 1.5 inches per side by means of a rotary cutter mounted over the conveyor belt. The unused dough web was removed by an overhead conveyor and was discarded. The individual dough pieces were conveyed to a single-stage fryer through which heated cooking oil at a temperature of about 345° F. was circulated by means of a centrifugal pump. The dough pieces were distributed uniformly across the width of the fryer and submerged beneath the oil surface for a total fry time of about 45 seconds. The moisture content of the dough pieces was reduced to less than 2%, by weight.

The resulting snack chips had a light golden brown color, containing about 35% oil, and when seasoned with approximately 1.65% salt, had a pleasant fried potato flavor similar to that of conventional potato chips fried from fresh cut potatoes. The fried product contained distinct V-shaped ridges very similar to those contained in rippled potato chip products made from fresh cut potatoes.

EXAMPLE 2

A dough was prepared as described in Example 1. This dough, however, was hand fed between two opposing smooth rolls approximately 8 inches in diameter by 18 inches wide to form a continuous dough sheet having a thickness of about 1.3 mm and smooth upper and lower surfaces.

The dough sheet was fed into the nip between the 12-inch corrugated rolls described in Example 1. The resulting rippled dough sheet was cut and fried as described in Example 1.

The rippled chips thus produced had color and flavor similar to those of Example 1. However, the ridges of these chips were not nearly as distinct as the ridges of chips of Example 1. While visible, it was apparent that the ridges had been substantially reduced in amplitude, and no longer closely resembled rippled potato chips made from fresh cut potatoes.

EXAMPLE 3

Rippled fabricated potato chips were prepared in a continuous pilot plant test which included the alternate step of partially dehydrating the dough pieces prior to frying. The dry premix contained, on a moisture free basis, 83.7% potato flakes, 5.4% potato starch, 9.7% dehydrated potatoes ground to pass a U.S. 20 mesh (0.84 mm) sieve, 0.6% vegetable oil, 0.49% salt and 0.20% emulstifier. Sufficient water was added to the blended dry mix to a moisture content of about 43% in the Stephan mixture. The dough was fed to a 4.5-inch set of corrugated rolls in the V-shaped design of FIG. 3. The dough sheet was cut into random curved potato chip-like shapes. The cut dough pieces were passed through a gas-heated enclosed conveyor maintained at a temperature of 480° F. With a residence time of about 15 seconds, moisture content was reduced to about 38%. The dough pieces were fried to a moisture content of below 2% at a temperature of about 340° F. Recycled dough from the cutter was added to subsequent batches with no deleterious effect on product quality. Resulting snack chips had a light golden brown color with fat content of about 32%. The fried product has a greater expansion with slightly bubbled texture as a result of the heat treatment.

EXAMPLE 4

A dough was prepared as in Example 1 and fed between two opposing 4.5-inch diameter by 18-inch wide corrugated rolls having the ridge design illustrated in FIG. 5. The dough did not automatically release from the sheeting rolls as in Examples 1 and 2, but rather stuck in the corners of the grooves of one or both rolls. Some small sections of dough sheet were obtained, however, and were cut and fried as in Example 1. The resulting chips had good ripple definition but the appearance was not that of a fresh cut ripple potato chip.

EXAMPLE 5

The dough of Example 1 was prepared as described therein and hand fed into a set of 4.5-inch diameter sheeting rolls having the corrugated design as the rolls of Example 1. The rolls of this example were scored as illustrated in FIG. 7, with the score marks 78 having walls forming an inclusive 60° angle. The score marks were cut perpendicular to the grooves 72 at circumferential intervals of one-half inch, and were cut into the ridges to the base of the ridge, that is, to the base 36 of roll 32 of FIG. 3. These rolls produced a dough sheet with transverse dough webs perpendicular to the alignment of the ripples. This dough sheet was cut and fried as described in Example 1. While the fried chips were somewhat thicker than those of Example 1, they had a pleasant waffled appearance while maintaining similar color, texture and flavor characteristics. The fried chips of this example were much less susceptible to breakage than chips made according to prior examples. For example, when subjected to a particularly rigorous breakage test (tumbling in a revolving drum for 5 minutes at 30 rpm), 76% of the chips from Example 1 were broken, whereas the product of this example showed only 33% broken after the same tumbling test.

EXAMPLE 6

Chips were prepared as in Example 5, except that both corrugated sheeting rolls were machined with transverse grooves to a depth of between one-half and two-thirds the depth of the grooves. The presulting waffled roduct had an appealing appearance and texture with transverse waffle webs on both sides of the chip, as illustrated in FIG. 8.

EXAMPLE 7

Chips were prepared as in Example 6, except that a roll having transverse scores or grooves was mated with a conventional grooved but unscored sheeting roll to produce a chip waffled on one side only, as illustrated in FIG. 9.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

We claim:

1. A method of forming a planar fabricated snack chip having a corrugated rippled surface with upper and lower surfaces thereof in phase, comprising:
    a. forming a friable dough having as a major ingredient therein a starch-containing component;
    b. feeding the dough into a nip between a pair of opposed corrugated sheeting rolls having a plurality of ridges and grooves formed in the surfaces thereof;
    c. mating the sheeting rolls so that a ridge of a first roll interfits with a groove of a second roll and a groove of the first roll interfits with a ridge of the second roll;
    d. forming a sheet of corrugated dough between the sheeting rolls having parallel undulating rippled surfaces on the top and bottom surfaces of the dough sheet corresponding to the corrugated sheeting roll;
    e. cutting the sheet of corrugated dough into individual snack food pieces; and then
    f. cooking the individual snack food pieces.

2. The method as recited in claim 1, wherein the major ingredient is dehydrated potato solids.

3. The method as recited in claim 1, wherein the major ingredient is a cereal grain selected from the group consisting of corn, wheat, rice, oats or mixtures thereof.

4. The method as recited in claim 1, wherein water is added to the starch-containing component to produce a dough having a moisture content of from about 35% to about 50%.

5. The method as recited in claim 1, wherein the dough is fed to the sheeting rolls prior to any significant work being performed thereon.

6. The method as recited in claim 1, wherein adjacent sides of a ridge or groove are aligned at an inclusive angle of 90° to one another.

7. The method as recited in claim 6, wherein the sides of a ridge or groove are aligned at a 45° angle to a longitudinal axis of the sheeting roll, such that the sides of the ridges and grooves in the undulating rippled surface of the sheet of corrugated dough are aligned at a 45° angle to the planar surface of the dough sheet.

8. The method as recited in claim 1, wherein the sheeting rolls are mated such that the gap between the rolls is uniform across the surface of the roll.

9. The method as recited in claim 1, wherein the dough contains a minor portion of an ungelatinized food starch selected from the group consisting of potato, corn, tapicoa and amioca starch.

10. The method as recited in claim 1, wherein each of the ridges of the pair of opposed corrugated sheeting rolls is scored in a direction transverse to said ridges such that a plurality of dough webs perpendicular to the ridges and grooves of the dough sheet are formed on both sides of the dough sheet.

11. A fabricated snack chip resulting from the method of claim 10.

12. The method as recited in claim 1, wherein each of the ridges of one of the pair of opposed corrugated sheeting rolls is scored in a direction transverse to said ridges such that a plurality of dough webs perpendicular to the ridges and grooves of the dough sheet are formed on one side of the dough sheet.

13. A fabricated snack chip resulting from the method of claim 12.

14. The method as recited in claim 1, further comprising heating the individual snack food pieces prior to cooking so as to reduce the moisture content thereof.

15. A method of forming a planar fabricated snack chip having an undulating rippled surface on both an upper and lower surface thereof, comprising:

a. forming a friable dough having as a major ingredient therein a starch-containing component;
b. feeding the dough into a nip between a pair of opposed corrugated sheeting rolls having a plurality of ridges and grooves.
c. providing a scored portion in a plurality of the ridges in a direction generally transverse to said ridges on at least one of the pair of opposed corrugated sheeting rolls about the periphery of said roll;
d. mating the sheeting rolls so that a ridge of a first roll interfits with a groove of a second roll and a groove of the first roll interfits with a ridge of the second roll;
e. forming a sheet of corrugated dough between the sheeting rolls having an undulating rippled surface on the top and bottom surfaces of the dough sheet corresponding to the corrugated sheeting rolls, and forming a transverse web of dough in the scored portion such that a plurality of dough webs perpedicular to the ridges and grooves of the dough sheet are formed on at least one side of the dough sheet.

16. The method as recited in claim 15, wherein the major ingredient is selected from the group consisting of dehydrated potato solids, corn, wheat, rice, oats, or mixtures of the same.

17. The method as recited in claim 15, wherein water is added to the starch-containing component to produce a dough having a moisture content of from about 35% to about 50%.

18. The method as recited in claim 15, wherein the dough is fed to the sheeting rolls prior to any significant work being performed thereon.

19. The method as recited in claim 15, wherein the adjacent sides, of the ridges and grooves are aligned at an inclusive 90° angle to one another and aligned at a 45° angle to a longitudinal axis of the sheeting roll.

20. The method as recited in claim 15, wherein the sheeting rolls are mated such that the gap between the rolls is uniform across the surface of the roll.

21. The method as recited in claim 15, further comprising heating the individual snack food pieces prior to cooking so as to reduce the moisture content thereof.

22. A method of forming planar fried snack food pieces having corrugations simulating rippled chips cut from fresh potatoes, comprising the steps of forming a friable dough sheeting the dough, imparting memory into the dough by passing the dough between a pair of opposed corrugated sheeting rolls having the ridges and grooves of a first roll mating with the grooves and ridges, respectively, of a second roll, said rolls counter-rotating about parallel axes, cutting the dough into individual snack food pieces, and then frying the individual snack food pieces such that they retain a corrugated rippled surface on the top and bottom surfaces thereof imparted by the sheeting rolls.

23. The method as recited in claim 22, wherein the individual snack food pieces are treated to remove moisture therefrom prior to frying.

24. The method as recited in claim 22, wherein the corrugated sheeting rolls are scored transverse to the corrugations such that a transverse web of dough is deposited between the corrugations.

* * * * *